DECODER CIRCUIT USING MAGNETIC CORE ELEMENTS AND OPERATING A DISPLAY DEVICE
Filed Feb. 3, 1965
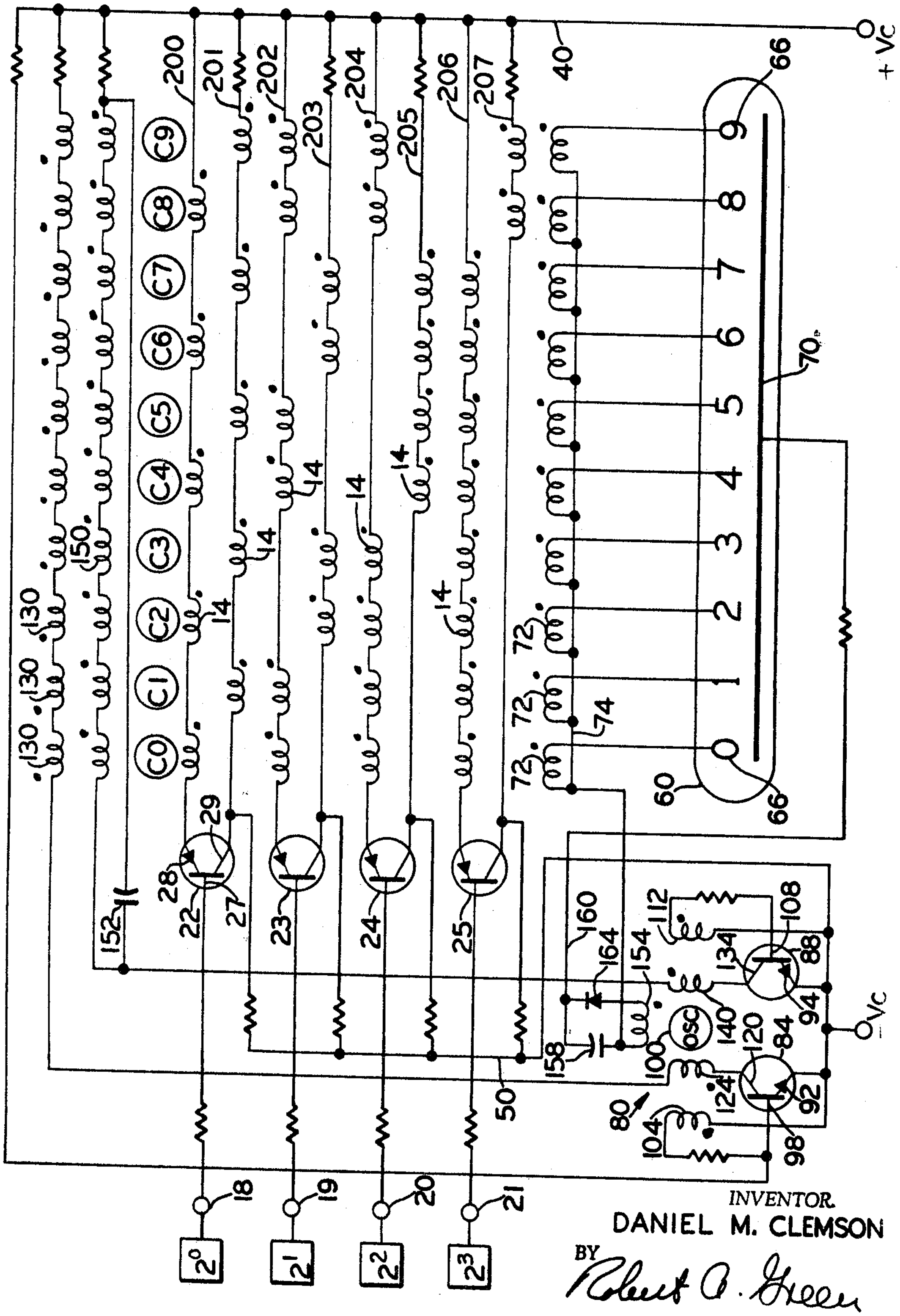
INVENTOR.
DANIEL M. CLEMSON
BY Robert A. Green
ATTORNEY United States Patent Office 3,418,460
Patented Dec. 24, 1968

3,418,460
DECODER CIRCUIT USING MAGNETIC CORE ELEMENTS AND OPERATING A DISPLAY DEVICE

Daniel M. Clemson, Wayzata, Minn., assignor to Burroughs Corporation, Detroit, Mich., a corporation of Michigan Filed Feb. 3, 1965, Ser. No. 430,071
4 Claims. (Cl. 235—155)

ABSTRACT OF THE DISCLOSURE

A binary-coded decimal to decimal decoder circuit which includes ten magnetic cores and a magnetic core oscillator having two output lines, one line coupled to a winding on each core in one polarity, and the other line coupled to a winding on each core in the opposite polarity so that, as the oscillator switches back and forth, it tends to switch each core. Sources of input binary-coded decimal bits of information are each coupled to a semiconductor switch, and each semiconductor switch is coupled to a pair of parallel paths, each including inhibit windings on different cores, the arrangement being such that each possible combination of signal bits causes current to flow through one of the paths associated with its switching device, and the inhibit windings are so arranged that, in each case, only one core is uninhibited and can be switched by the oscillator. Each of the cores is coupled by a winding to a display device, and, in each decoding operation, the uninhibited core causes its associated display device to operate and display the decimal equivalent of the binary-coded decimal input information.

This invention relates to electronic decoder circuits and, particularly, to decoder circuits which include a display device for displaying the output of the decoding operation and using square loop magnetic core elements for performing the decoding operation.

There are many types of electronic decoder circuits in the prior art, and, generally, they include an indicator or display device for displaying the output of the decoder operation. Usually, the operation converts binary-code signals to decimal signals, and the most common type of device for displaying the decimal output is a gaseous cold cathode glow tube such as the type 6844A tube. Generally, this type of tube requires a relatively high voltage power supply of the order of 200 volts for its operation. In addition, some decoder circuits which use transistors to drive the decimal display device require transistors which are able to withstand relatively high voltages. While these are not insurmountable problems, it is always desirable, particularly from an economic standpoint, to be able to operate electronic circuits with low voltage supplies, if possible.

Accordingly, the objects of the present invention concern the provision of an improved electronic signal decoder circuit including a relatively high voltage output display device, the circuit being arranged so that it performs the decoding operation and operates the display device without requiring high voltage power supplies.

Briefly, a circuit embodying the invention utilizes square loop magnetic core elements carrying a plurality of windings correlated to provide the desired decoding operation. An oscillator is coupled to all of the cores for alternately setting and resetting the cores. In addition, each core carries an output winding having a large number of turns for generating a voltage large enough to operate an indicator device which requires relatively high voltages for its operation.

The input signal bits, which are assumed to be in binary-coded decimal code and are to be converted to decimal code, are coupled each to two current flow paths including inhibit windings on the magnetic cores, with the two paths and the windings being arranged so that the conversion of each group of input signals to the proper decimal output signal is achieved. This operation is manifested by the switching of a single core and the resultant energization of the proper decimal character in the display device.

The invention is described in greater detail by reference to the drawing wherein the single figure is a schematic representation of a decoder circuit and display device embodying the invention.

The principles of the invention are shown embodied in a decoder circuit 10 for converting binary-coded decimal signals to pure decimal signals. The circuit includes ten magnetic cores, C0 through C9, which are made of a material having a rectangular hysteresis characteristic which permits the cores to be shifted between two stable storage states, each of which can be maintained indefinitely. Such cores and materials are well known. Each core carries a plurality of inhibit windings 14 provided thereon in a pattern arranged, according to the principles of the invention, to perform the required signal conversion operation when groups of binary-coded decimal signal bits are applied to the circuit. In the circuit 10, it is assumed that the binary-coded decimal signals, which are applied to the circuit, are each made up of four signal bits which have the characteristic binary "0" or "1" representation and appear at the terminals as two different D.C. voltage levels. The terminals 18, 19, 20, 21 receive the $2^0$, $2^1$, $2^2$, $2^3$ signal bits, respectively. Each input terminal 18, 19, 20, 21 is coupled through a gate or switching device to a current flow path which includes a plurality of core windings. The gate or switching device may be an electronic discharge device such as a triode or tetrode transistor or the like. For purposes of illustration, the switches are shown as PNP transistors 22, 23, 24, 25.

Each transistor has base, emitter, and collector electrodes 27, 28, 29, respectively, with the base electrode 27 comprising the input electrode of the transistor and being coupled to one of the input terminals. Thus, terminals 18, 19, 20, and 21 are coupled to the base electrodes 27 of transistors 22, 23, 24, 25, respectively. In each transistor, the collector-emitter current flow path is coupled through a selected group of core inhibit windings 14 to a bus 40 which is connected, in turn, to a positive D.C. power source V*c*. Each collector electrode 29 is also connected through a second path which includes a plurality of windings 14 to the bus 40 and through a resistive path to a second bus 50 which is connected to the negative side of power supply V*c*. Thus, two current flow paths are associated with each input terminal, one path being merely a resistive path including inhibit windings 14 and the other path including a gate or switch leading to the inhibit windings so that current flow through the path can be blocked.

The specific inhibit winding arrays are as follows. In the first pair of paths coupled to terminal 18, the collector-emitter path 200 of transistor 22 includes windings 14 on cores C0, C2, C4, C6, and C8, and the path 201 from the bus 50 to bus 40 includes windings on cores C1, C3, C5, C7, and C9. In the second pair of paths coupled to terminal 19, the collector-emitter path 202 of transistor 23 includes windings 14 on cores C0, C1, C4, C5, C8, C9, and the other path 203 from bus 50 to bus 40 includes windings on cores C2, C3, C6, C7.

In the third pair of paths coupled to terminal 20, the collector-emitter path 204 of transistor 24 includes windings 14 on cores C0, C1, C2, C3, C8, C9, and the path 205 from bus 50 to bus 40 includes windings on cores C4, C5, C6, C7. In the fourth pair of paths from terminal 21, the collector-emitter path 206 from transistor 25 includes windings on cores C0 to C7 inclusive, and the path 207 from bus 50 to bus 40 includes windings on cores C8 and C9.

According to the invention, the pairs of current flow paths and windings are arrayed so that, depending on the combination of binary bits applied at terminals 18, 19, 20, 21, current flows through one path of each pair. This current is inhibit current for the cores, that is, it prevents switching of the cores and flows through inhibit windings on all cores but one. This one core, which does not receive inhibit current and is not inhibited, can switch and generate an output signal which represents the decimal equivalent of the particular combination of input binary bits. Each combination of input binary bits thus switches one particular core to provide the proper corresponding decimal representation.

The decimal number represented by the output signal generated by each core is adapted to be displayed by a gaseous glow cathode indicator tube 60 which may be a type 6844A tube. This type of tube, which is shown schematically in the drawing, includes ten indicator cathode electrodes 66, numerals "0" to "9," and an anode electrode 70. Each cathode may be caused to glow by applying a potential of about 170 volts between it and the anode electrode. In order to couple the display tube 60 to the aforementioned circuitry, each core is provided with an output winding 72 which has one end connected to one glow cathode 66 and the other end connected to a bus 74. Each output winding 72 has a sufficient number of turns so that, when its core is switched in a manner to be described in detail below, a voltage is generated therein which is of sufficient magnitude to cause the associated cathode to glow when it is applied to the cathode and another suitable potential is applied to the anode.

The circuit 10 includes an oscillator 80 which may be of any suitable type for performing the functions described below. One suitable oscillator shown in the drawing includes two triode transistors 84 and 88, shown as NPN transistors for purposes of illustration, having their emitters 92 and 94 connected together and to a negative bias source such as V*c*. The base electrode 98 of the transistor 84 is connected to a resistive path to the bus 40. The oscillator also includes in its circuit a magnetic core 100 which carries a plurality of windings as follows. The base electrode 98 of transistor 84 is coupled through a resistive path and a winding 104 to the negative terminal of power supply V*c*. The base electrode 108 of transistor 88 is similarly connected through a winding 112. The collector or output electrode 120 of transistor 84 is coupled through a winding 124 on the core 100 and through a winding 130 on each of the ten cores C0 to C9 to the bus 40. The collector electrode 134 of transistor 88 is similarly connected through a winding 140 on the core 100 and a winding 150 on each of the ten cores C0 to C9 to the bus 40. A capacitor 152 is coupled across all of the windings 150 in order to limit voltage spikes at collector 134 of transistor 88. The oscillator core 100 also carries a high voltage generating winding 154 which has one end coupled to one end of each of the high voltage windings 72 on the ten cores. The other end of the winding 154 is coupled through a diode 164, oriented as shown, to the lead 160 and the anode of the indicator tube. Filter capacitor 158 is coupled between the former end of winding 154 and lead 160.

The oscillator 80 might be another type than that shown. For example, it may be constructed without a magnetic core, and it might use electron tubes.

Operation of the circuit of the invention is as follows. As the oscillator 80 oscillates, a switching current is passed alternately through windings 130 and 150, and this current attempts to switch cores C0 through C9. When a group of signal bits having a binary-coded decimal representation is applied to the terminals 18, 19, 20, 21, inhibit current flows through windings 14 on all but one core, and all cores are prevented from switching except this one core. This one core is thus switched by the oscillator and generates a negative voltage in its output winding 72 which is applied to a cathode 66. At the same time, a high voltage is generated in oscillator winding 154 and is applied as a positive pulse through diode 164 to the anode 70 of tube 60. This combination of potentials causes the cathode to glow.

Consider a specific decoding operation. As is well known in the art, the signal bits appearing at the terminals 18, 19, 20, and 21 are either binary 0 or binary 1 with the signals having different voltage levels which are selected to provide the desired operation. One signal is considered the complement of the other. Assume that in one instance the signal bits are 0000 which together represent a decimal "zero." With these signal bits applied to terminals 18, 19, 20, and 21, and with the bias voltages properly arranged, none of the transistors 22, 23, 24, 25 is turned on and no current flows in the emitter-collector paths. Thus, current flows in all of the other paths between buses 40 and 50. It can be seen that inhibit current flows through windings 14 on all cores C except core C0. Thus, the oscillator can switch core C0 with each oscillation. Thus, the cathode numeral "zero" coupled to the core C0 is caused to glow.

Similarly, bits 0001 having a representation of decimal "one" applies a negative potential on the base of only transistor 22 which is turned on while the other transistors are held off. Thus, current flows in paths 200, 203, 205, and 207. This provides inhibit current in windings on all cores except core C1 which is thus switched by oscillator 80. Thus, cathode numeral "one" is caused to glow.

In the same way, each combination of signal bits representing numerals "one" through "ten," when applied, cause inhibit current to flow in the proper paths so that one proper core is switched and the corresponding proper decimal numeral in the indicator tube is caused to glow.

The invention thus provides an improved binary-to-decimal decoder which is relatively simple to construct and generates its own required high voltages and thus requires no high voltage power supplies for operating any of its components, particularly the readout device.

What is claimed is:

1. A binary to decimal decoder circuit comprising:

a plurality of magnetic cores, each having a plurality of inhibit windings thereon, a magnetic core oscillator carrying two windings, each coupled to an output path, one path connected to a series of switching windings, one wound on each core, the other path being connected to a second series of windings, one being wound on each core, each core thus carrying one winding of each path, said oscillator being adapted to pass current alternately first through one of said paths and then through the other of said paths, each passage of current tending to switch all of said cores, a plurality of sources of signal bits, each coupled to its own switching device, with said switching devices each connected to a different grouping of said inhibit windings, said sources being adapted to operate said switching means in different combinations whereby said inhibit windings are energized in different combinations with each combination of signal bits inhibiting all but one core, and a display device coupled to each of said cores and adapted to provide a visual indication of the one uninhibited core for each combination of signal bits.

2. The circuit defined in claim 1 and including an output winding on each core and coupled to the display device for that core.

3. A binary-coded decimal to decimal decoder circuit comprising:

ten magnetic cores, a magnetic core oscillator having two windings, each coupled to an output path, one path connected to a series of ten switching windings, each wound in one polarity on one core, the other path being connected to a second series of ten switching windings, each being wound in the opposite polarity on one core, said oscillator being adapted to pass current alternately first through one of said paths and then through the other of said paths, each passage of current tending to switch all of said cores, four sources of bits of binary-coded decimal information, each coupled to its own switching device and adapted to be applied thereto in different combinations, each combination having a different meaning in binary-coded decimal code, each said switching device being connected to a pair of inhibit current flow paths, each including inhibit windings on selected ones of said cores whereby, when a group of signals is applied to said switching devices, one or the other of its paths passes current and all but one core is inhibited, said one uninhibited core being switched by said oscillator, and a display device coupled to a winding on each of said cores and adapted to receive a display signal from the one uninhibited core selected by each combination of signal bits.

4. The circuit defined in claim 3 wherein the cores occupy positions numbered 0, 1, 2, 3, . . . 9, and wherein one pair of inhibit current paths is associated with the $2^0$ signal bit and one path includes a switch and inhibit windings on cores at positions 0, 2, 4, 6, and 8, and the other path includes inhibit windings on cores at positions 1, 3, 5, 7, and 9, the second pair of paths is associated with the $2^1$ signal bit and one path includes a switch and inhibit windings on cores at positions 0, 1, 4, 5, 8, and 9, and the other path includes inhibit windings on cores at positions 2, 3, 6, and 7, the third pair of paths is associated with the $2^2$ signal bit and one path includes a switch and inhibit windings on cores at positions 0, 1, 2, 3, 8, and 9, and the other path includes inhibit windings on cores at positions 4, 5, 6, and 7, and the fourth pair of paths is associated with the $2^3$ signal bit and one path includes a switch and inhibit windings on cores at positions 0, 1, 2, 3, 4, 5, 6, and 7, and the other path includes inhibit windings on cores at positions 8 and 9.

References Cited

UNITED STATES PATENTS 2,733,860 2/1956 Rajchman -------- 340—347 X

MAYNARD R. WILBUR, *Primary Examiner.*

G. EDWARDS, *Assistant Examiner.*

U.S. Cl. X.R.

390—347